United States Patent [19]

Brzozowski

[11] 4,188,228

[45] Feb. 12, 1980

[54] FIBER GLASS MAKING PELLETS CONTAINING FIBER GLASS CULLET

[75] Inventor: Stanley F. Brzozowski, Coraopolis, Pa.

[73] Assignee: PPG Industries, Inc., Pittsburgh, Pa.

[21] Appl. No.: 17,758

[22] Filed: Mar. 5, 1979

Related U.S. Application Data

[60] Continuation of Ser. No. 902,598, May 4, 1978, abandoned, which is a division of Ser. No. 862,075, Dec. 19, 1977, abandoned.

[51] Int. Cl.$^2$ ............................................... C03B 5/16
[52] U.S. Cl. ........................................ 106/50; 106/54; 106/73.6; 106/DIG. 8
[58] Field of Search .................. 106/DIG. 8, 50, 73.6, 106/54

[56] References Cited

U.S. PATENT DOCUMENTS

| | | | |
|---|---|---|---|
| 2,970,924 | 2/1961 | Fox | 106/50 |
| 3,508,939 | 4/1970 | St. Laurent et al. | 106/50 |
| 4,050,947 | 9/1977 | Ahlgren et al. | 106/54 |
| 4,066,466 | 1/1978 | Neeley | 106/50 |
| 4,074,989 | 2/1978 | Brzozowski | 106/50 |
| 4,074,990 | 2/1978 | Brzozowski | 106/50 |
| 4,074,991 | 2/1978 | Brzozowski | 106/50 |

FOREIGN PATENT DOCUMENTS 1303414  1/1973  United Kingdom .............. 106/DIG. 8

OTHER PUBLICATIONS

Glass—Jan. 1976—"New Uses for Waste Glass"—pp. 7-8.
Ceramic Industry Magazine—Jan. 1967—"Materials for Ceramic Processing"—Cullet, p. 88.
Washington Post—Jul. 2, 1978, "Bottle Maker Cuts Cost, Pollution With Old Glass", pp. E1, E3.

*Primary Examiner*—Helen M. McCarthy
*Attorney, Agent, or Firm*—John E. Curley

[57] ABSTRACT

Glass pellets for use in producing glass for the manufacture of glass fibers are described in which a significant portion of the pellets are made up of fiber glass cullet. The pellets of glass fiber batch contain quantities of fiber glass cullet from 5 percent by weight to 35 percent or more by weight. The glass fiber cullet employed is in the form of ground glass or short glass fibers, 0.0625 to 0.5 inch (0.158 to 1.27 centimeters).

12 Claims, No Drawings

FIBER GLASS MAKING PELLETS CONTAINING FIBER GLASS CULLET

This application is a continuation of application Ser. No. 902,598 filed May 4, 1978, which was a division of application Ser. No. 862,075 filed Dec. 19, 1977, both now abandoned.

BACKGROUND OF THE INVENTION

In the manufacture of glass fibers, glass batches are employed which have a low alkali metal content, i.e., typically below 2 percent by weight on an $Na_2O$ basis. In the production of pellets for glass batch feeding soda-lime glass pellets have been described extensively in the literature. Thus, glass making pellets have been described in U.S. Pat. No. 3,880,639 which employ soda-lime batch ingredients. A similar manufacture of glass making pellets is described in U.S. Pat. No. 2,366,473. In the latter patent the use of ground glass in the pelletizing of soda-lime glass is described as having an advantage because of the tendency for the soda lime ingredients to chemically set the ground glass.

A typical fiber glass batch is shown in U.S. Pat. No. 2,334,961 and that batch, like most fiber glass batches, contains minor quantities of $Na_2O$ (2 percent or less) and relatively large quantities of $B_2O_3$, i.e., above 6 percent by weight, typically 8 to 12 percent by weight.

Boron-containing fiber glass batch pellets utilizing boric acid, anhydrous boric acid or colemanite as the boron source may be prepared by introducing the batch ingredients in appropriate proportions into a pelletizing zone, such as an inclined rotating disc pelletizer, as is shown in U.S. Pat. No. 3,914,364, which is incorporated herein by reference, and adding to the batch ingredients as they are rotated on the pelletizer sufficient water to agglomerate the batch materials and support the continuous production of glass batch pellets of a desired size. In lieu of a disc pelletizer, rotary kilns or other similar devices may be employed. The pellets range in nominal diameter, for example, from about 0.125 to about 1.00 inch (0.3175 to 2.54 centimeters) and preferably between about 0.375 and 0.625 inch (0.9525 and 1.5875 centimeters). Sufficient water is added to bind the batch ingredients together and provide pellets of the batch materials.

Preferably, these pellets contain approximately 5 to 22 percent by weight free water, when boric acid is employed, 10 to 25 percent free water when anhydrous boric acid is employed and 5 to 20 percent free water when colemanite is employed. Most preferably, the water is added to provide approximately 11 to 13 percent by weight free water for boric acid, 15 to 17 percent free water for anhydrous boric acid and 10 to 13 percent free water for colemanite. The pellets after formation are dried at temperatures preferably from about 220° F. (104.4° C.) or less up to about 1000° F. (537.8° C.) or more for boric acid, at a temperature in excess of 450° F. (232.2° C.) for anhydrous boric acid and at temperatures preferably between about 220° F. (104.4° C.) or less to 770° F. (410° C.) for colemanite for a sufficient period of time to provide a free water conent preferably of below about 1 percent by weight. Hard, substantially non-dusting pellets are thus produced. The hard, non-dusting pellets thus formed can be fed to a glass melting furnace and exposed to conditions in excess of 2700° F. (1482.2° C.) without any explosions of the pellets occurring.

When colemanite is employed as a boron source, the batch ingredients may contain only colemanite as the boron source. Optionally, up to about 75 percent or more of the colemanite, on a $B_2O_3$ basis, may be substituted by boric acid, while adjusting for lost silica, calcium and aluminum contained in the colemanite.

In a typical "E" glass type boron-containing glass fiber forming batch composition, such as is illustrated in U.S. Pat. No. 2,334,961, silica, clay, limestone, coal, fluorspar, sodium sulfate, ammonium sulfate and boric acid are used as the ingredients. In lieu of boric acid, colemanite may be used. The use of colemanite is described in U.S. Pat. No. 3,274,006. Colemanite has a chemical composition of $Ca_2B_6O_{11}$ $Ca_2B_6O_{11} \cdot 5\ H_2O$. Optionally, boric acid may be substituted for up to about 75 percent or more of the colemanite on an equivalent $B_2O_3$ basis while adjusting for lost silica, calcia and alumina from the colemanite.

These glass batch ingredients, when used to prepare pellets, are believed to undergo several chemical reactions during their deposition on the pelletizing disc and while water in the quantity sufficient to produce the pellets is being added to the ingredients and during the drying of the pellets. The primary reactions involved in the preparation of the pellets are believed to be as follows:

  (1)

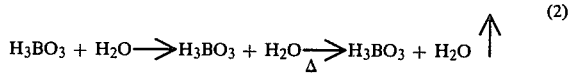  (2)

  (3)

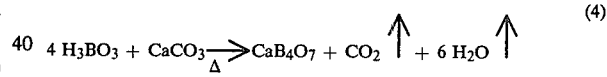  (4)

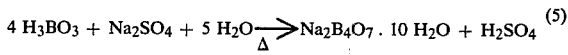  (5)

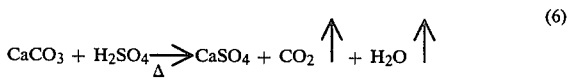  (6)

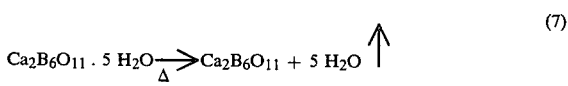  (7)

(Colemanite) 770° F. (410° C.)

In reaction (1) the anhydrous boric acid, if employed, is reacted with water to form boric acid. In reaction (2) the boric acid and water react to dissolve the boric acid and then the boric acid is recrystallized as shown in the equation. The recrystallized boric acid is dehydrated during the drying step to drive water off, as can be seen in equation (3). Some of the boric acid itself, during the drying of the pellets, reacts with the calcium carbonate present to form hydrated calcium pyroborate, carbon dioxide, and water in accordance with equation (4). Boric acid also reacts with the sodium sulfate present in the batch in accordance with equation (5) to form hydrated sodium tetraborate and sulfuric acid. Limestone and sulfuric acid may also react to form calcium sulfate, carbon dioxide and water, in accordance with equation (6).

It is extremely important in the preparation of glass batch pellets that if colemanite is used as the single source of $B_2O_3$, temperatures above about 770° F. (410° C.) by avoided during the drying step. Attempts to dry these pellets above this temperature result in the disintegration of the pellets and their return to the powdery state. Thus, extreme care is taken to provide pellets by regulating the drying operation, such that the pellets are dried at temperatures not exceeding 770° F. (410° C.).

When boric acid is substituted for up to about 75 percent or more of the colemanite, with proper adjustments being made for silica, calcium and alumina in composition, these temperature parameters must still be followed. Hard, non-dusting pellets can be produced at drying temperatures up to 770° F. (410° C.).

When drying the colemanite containing pellets, should the temperature of the pellets exceed 770° F. (410° C.), it has been found that the pellets crack and disintegrate. This problem, however, may be solved by pretreating the colemanite prior to its addition to the glass batch, and then forming the glass batch using the pretreated colemanite into pellets. This pretreatment comprises heating the colemanite at a temperature above 770° F. (410° C.) for a sufficient period of time until substantially all of the chemically bound water in the colemanite is driven from this material. An equation for this reaction is shown above as equation (7). This water amounts to approximately 21 to 22 percent by weight. There is also an expansion of up to 33 percent by volume of the colemanite when the chemically bound water is driven off, which accounts for the cracking of pellets when heated above this temperature using untreated colemanite. By employing this pretreatment to the colemanite prior to its introduction into the glass batch, pellets as heretofore described may be dried at any temperature from about 220° F. or less (104.4° C.) to the melting point of a given pellet, and preferably between about 220° F. and 1000° F. (104.4° C. and 537.8° C.), without fear of cracking, to produce hard, non-dusting pellets.

The preparation of the fiber glass batch pellets above referred to are described in more detail in my co-pending applications Ser. No. 739,883, Ser. No. 739,884 and Ser. No. 739,885, each of which was filed on Nov. 8, 1976, now U.S. Pat. Nos. 4,074,989, 4,074,990 and 4,074,991, respectively, and all three of which are incorporated herein by reference.

THE PRESENT INVENTION

In accordance with the instant invention I have found that, despite the low soda content of fiber glass batch ingredients, I can incorporate into pellets of fiber glass batch ingredients considerable quantities of fiber glass cullet and make acceptable pellets useful as feed to a fiber glass furnace. The cullet fed is a fiber glass composition which is in the form of ground or pulverized glass or short fibers, i.e., 0.0625 inch(0.158 centimeter) or less up to about 0.5 inch (1.27 centimeters). Fibers in a length above 0.5 inch (1.27 centimeters) are not in general conducive to good pellet formation. Fibers for purposes of this invention include individual filaments or strands which contain many filaments. The use of fiber glass cullet in pellets of fiber glass batch in accordance with this invention enhances the pellets by providing a substantial quantity of glass in the pellet which assists in melting the raw batch ingredients such as $SiO_2$ present in the pellet. The presence of significant quantities of ground or fibrous glass intimately adhered to other batch ingredients in the pellet also reduces the tendency of such recycled cullet to be carried away from the furnace proper in flue gases. Thus, the pellets prepared in accordance with this invention make use of waste glass as furnace feed while providing a minimum of lost feed due to dust carryover in furnaces in which recycled glass is used.

A typical fiber glass composition contains as essential ingredients $SiO_2$ in the range of 52 to 56 percent, $Al_2O_3$ at 12 to 16 percent, CaO at 16 to 19 percent, MgO at 3 to 6 percent and $B_2O_3$ at 9 to 11 percent, all percentages being by weight of the batch. This type of glass is referred to in the fiber glass art as "E" glass and is the glass described in U.S. Pat. No. 2,334,961.

Another typical fiber glass composition is known in the art as "621" glass and is described in U.S. Pat. No. 2,571,074. This typical fiber glass composition has $SiO_2$ at 52 to 56 percent, $Al_2O_3$ at 12 to 16 percent, CaO at 19 to 25 percent and $B_2O_3$ at 8 to 13 percent. The pellets of the instant invention can be formed of these glasses with cullet ranging from 5 to 35 percent by weight of the pellet and it is further established that the $B_2O_3$ content can be in the range of 6 to 13 percent by weight in either of these compositions.

In preparing cullet for use in the pelletizing operation contemplated, it is of course understood that the glass used is a typical fiber glass composition. Since such glass is normally supplied from waste glasses in a fiber glass manufacturing facility, and since such waste glasses are normally coated during manufacture, it is important that the waste glasses used be treated to remove any coatings contained thereon. One such process for removing coatings from waste fiber glass is described in my assignee's co-pending application Ser. No. 783,130, filed March 31, 1977, which is incorporated herein by reference. Other processes for treating waste fiber glass having chemical coatings thereon are also described in U.S. Pat. No. 3,852,108 and U.S. Pat. No. 3,847,664.

Fiber glass compositions which are free of organic contaminants are sized for use in preparing pellets in accordance with this invention to provide glass sizes of 60 to 325 mesh in the case of ground or pulverized glasses. Where the fiber glass compositions used to prepare the pellets are in fibrous form, the length is typically between about 0.625 inch (0.158 centimeter) to about 0.5 inch (1.27 centimeters). The fibrous glass is of course also free of organic contamination.

In preparing pellets using fiber glass cullet and fiber glass batch compositions, the cullet may be employed in a range of from 5 to about 35 percent by weight of the batch. Preferably the cullet is used in a range of 10 to 30 percent by weight.

In a typical operation the cullet is prepared by burning off the binder contained on fiber glass strand which has been sized by chopping into lengths of about ¼ inch(0.635 centimeters). The material cut in these lengths is incinerated at temperatures of 300° F. to 1200° F.(148.9° C. to 648.9° C.) and is preferably crushed on a roll mill to about 60 to 325 mesh (U.S. Sieve Series). This material is used as the cullet and has the following composition:

| Cullet | |
| --- | --- |
| | Weight Percent |
| $Al_2O_3$ | 13.56 |
| $SiO_2$ | 54.31 |
| $K_2O$ | 0.12 |
| CaO | 21.92 |
| $TiO_2$ | .45 |
| $Fe_2O_3$ | 1.08 |
| MgO | .35 |
| $Na_2O$ | .78 |
| $B_2O_3$ | 6.80 |
| $F_2$ | .47 |

A standard boric acid fiber glass batch having the following composition is employed to supply the major portion of the pelletized batch:

| Batch Composition | |
| --- | --- |
| | Weight Percent |
| $Al_2O_3$ | 13.64 |
| $SiO_2$ | 54.41 |
| $K_2O$ | 0.13 |
| CaO | 22.0 |
| $TiO_2$ | 0.42 |
| $Fe_2O_3$ | 0.22 |
| MgO | 0.38 |
| $Na_2O$ | 0.75 |
| $B_2O_3$ | 7.52 |
| $F_2$ | 0.77 |

The batch composition described above is mixed with the cullet composition described above with the quantity of cullet being regulated to provide in the final batch 10 percent by weight cullet basis the total batch. This mixed batch is then fed to a disc pelletizer with water being fed thereto at a controlled weight to provide 15 percent by weight water to the batch ingredients in pellet form. The pellets are continuously formed until the total batch has been added. Upon completion of the pellet formation, the pellets are heated in an oven at temperatures between 220° F. (104.4° C.) to about 1000° F. (537.8° C.) until their free water content is below about 1 percent by weight. Pellets prepared in this manner are readily melted to provide a molten glass source from which glass fibers may be drawn.

If the batch compositions used to make the cullet-glass batch pellets contain anhydrous boric acid rather than hydrated boric acid as described above, the pellets are formed using 10 to 25 percent water and they are dried at temperature above 450° F. (232.2° C.) until they reach a free water below 1 percent by weight. Where colemanite is used as the boric acid source in the batch used to make the cullet-glass batch pellets, 5 to 20 percent water is used making the pellets and the finished pellets are dried at temperatures between 220° F. (104.4° C.) to 770° F. (410° C.) to a free water content of less than about 1 percent.

The pellets made may be preheated prior to their addition to the glass melting furnace such as, for example, by passing them through flue gases of the furnace, or passing the gases through a bed of the pellets. In addition to preheating the pellets and thus reducing the amount of furnace input energy needed to melt them, this passage of flue gases through a bed of pellets may cause a reduction of air pollution from the flue gases by removing via a filtering action at least part of the harmful materials, such as $F_2$ and $B_2O_3$, from the flue gases. Utilizing hot flue gases at temperatures typically in the range of about 800° F. to 2850° F. (426.7° C. to 1565.6° C.), pellets can be preheated to temperatures of about 200° F. to 1500° F. (93.3° C. to 815.6° C.) to recover sensible heat and assist in reducing the amount of fuel needed to melt the pellets fed to the furnace.

In lieu of the pulverized crushed fiber glass cullet used in the above example, short fibers of fiber glass may be readily employed. In this type of pelletizing operation the fibers of fiber glass are first incinerated at high temperature to remove from their surface all organic coating material present thereon. As has been previously stated, the fibers are regulated in length to between 0.0625 to 0.5 inch (0.158 to 1.27 centimeters) when they are used in pellet manufacture. It is preferable to cut them in the desired length prior to heat treating them to remove coatings present thereon. The coatings normally present on scrap fiber glass are typically resins, rubber latex, silanes, waxes, oils and the like and incineration at high temperatures in the presence of oxygen is sufficient to burn them away so long as the temperatures are maintained below the softening or melting point of the glass composition. Typically temperatures in the incineration treatment are in the range of 300° F. (148.9° C.) to about 1200° F. (648.9° C.). Should it be desired, the cullet, after grinding or crushing in those instances where this material form is employed as cullet, may be subjected to a magnetic treatment to remove any excess iron picked up by the ground or pulverized glass in the pulverizing equipment.

While the invention has been described with reference to certain specific embodiments, it is not intended to be limited thereby except insofar as appears in the accompanying claims.

I claim:

1. In a fiber glass making composition comprising a pellet of batch ingredients consisting essentially of 52 to 56 percent $SiO_2$, 12 to 16 percent $Al_2O_3$, 16 to 25 percent CaO and 6 to 13 percent $B_2O_3$ the improvement comprising the presence in the pellet from about 5 to about 35 percent by weight of the pellet of a fiber glass cullet having the composition recited above, said fiber glass cullet being free of organic contaminants.

2. In a fiber glass making composition comprising a pellet of batch ingredients consisting essentially of 52 to 56 percent $SiO_2$, 12 to 16 percent $Al_2O_3$, 16 to 19 percent CaO, 3 to 6 percent MgO, 6 to 13 percent $B_2O_3$ the improvement comprising the presence in the pellet from about 5 to about 35 percent by weight of the pellet of a fiber glass cullet of the composition recited above, said fiber glass cullet being free of organic contaminants.

3. In a fiber glass making composition comprising a pellet of batch ingredients consisting essentially of 52 to 56 percent $SiO_2$, 12 to 16 percent $Al_2O_3$, 19 to 25 percent CaO, and 6 to 13 percent $B_2O_3$ the improvement comprising the presence in the pellet from about 5 to about 35 percent by weight of the pellet of a fiber glass cullet having the composition recited above, said fiber glass cullet being free of organic contaminants.

4. The pellets of claim 1 wherein the pellets contain less than 1 percent water.

5. The pellets of claim 2 wherein the pellets contain less than 1 percent water.

6. The pellets of claim 3 wherein the pellets contain less than 1 percent water.

7. The pellets of claim 1 wherein the said glass is in pulverized, particulate form in the range of 60 to 325 mesh or less.

8. The pellets of claim 1 wherein the said glass is in the form of fibers in lengths of 0.0625 inch (0.158 centimeter) to about 0.5 inch (1.27 centimeters).

9. The pellets of claim 2 wherein the said glass is in the form of fibers in lengths of 0.0625 inch (0.158 centimeter) to about 0.5 inch (1.27 centimeters).

10. The pellets of claim 2 wherein the glass is in pulverized, particulate form in the range of 60 to 325 mesh or less.

11. The pellets of claim 3 wherein the said glass is in pulverized, particulate form in the range of 60 to 325 mesh or less.

12. The pellets of claim 3 wherein the said glass is in the form of fibers in lengths of 0.0625 inch (0.158 centimeter) to about 0.5 inch (1.27 centimeters).

* * * * *